(12) United States Patent
Misumi et al.

(10) Patent No.: US 11,701,864 B2
(45) Date of Patent: Jul. 18, 2023

(54) METAL/RESIN COMPOSITE STRUCTURE AND MANUFACTURING METHOD OF METAL/RESIN COMPOSITE STRUCTURE

(71) Applicant: MITSUI CHEMICALS, INC., Tokyo (JP)

(72) Inventors: Masaki Misumi, Yokohama (JP); Kazuki Kimura, Sodegaura (JP); Kaoru Minagawa, Toyota (JP)

(73) Assignee: MITSUI CHEMICALS, INC., Tokyo (JP)

( * ) Notice: Subject to any disclaimer, the term of this patent is extended or adjusted under 35 U.S.C. 154(b) by 445 days.

(21) Appl. No.: 16/758,475

(22) PCT Filed: Oct. 25, 2018

(86) PCT No.: PCT/JP2018/039737
§ 371 (c)(1),
(2) Date: Apr. 23, 2020

(87) PCT Pub. No.: WO2019/082983
PCT Pub. Date: May 2, 2019

(65) Prior Publication Data
US 2020/0254728 A1 Aug. 13, 2020

(30) Foreign Application Priority Data
Oct. 27, 2017 (JP) .............................. JP2017-208197

(51) Int. Cl.
*B29C 45/14* (2006.01)
*B32B 15/088* (2006.01)
(Continued)

(52) U.S. Cl.
CPC ............ *B32B 15/088* (2013.01); *B29C 45/14* (2013.01); *B32B 3/30* (2013.01); *B32B 15/20* (2013.01);
(Continued)

(58) Field of Classification Search
CPC . C08L 2205/02; C08L 2205/025; B32B 27/34
See application file for complete search history.

(56) References Cited

U.S. PATENT DOCUMENTS 5,183,843 A * 2/1993 Sakai ..................... C08K 5/098
524/400
6,956,081 B2 * 10/2005 Ebert ....................... C08L 77/02
524/495
(Continued)

FOREIGN PATENT DOCUMENTS

CN 102753342 A 10/2012
CN 103429413 A 12/2013
(Continued)

OTHER PUBLICATIONS

EMS Grivory® Technical Data Sheet for Grivory® G21, 2005, https://ems.materialdatacenter.com/eg/en/main/ds/Grivory+G+21?mdc5=18v3ma7ina58a05cmjdc13ugf0 (Year: 2005).*
(Continued)

*Primary Examiner* — Michael C Romanowski
(74) *Attorney, Agent, or Firm* — Foley & Lardner LLP

(57) ABSTRACT

A metal/resin composite structure includes: a metal member (M) having a fine uneven surface; and a polyamide-based resin member (A) bonded to the metal member (M), and the polyamide-based resin member (A) satisfies the following condition [A1] and condition [A2]:
[A1] a glass transition temperature (Tg) observed by a differential scanning calorimeter (DSC) is equal to or higher than 85° C. and equal to or lower than 140° C.; and
[A2] a crystallization temperature (Tc) observed by a differential scanning calorimeter (DSC) is equal to or higher than 250° C. and equal to or lower than 292° C.

13 Claims, 3 Drawing Sheets

(51) Int. Cl.
    *B32B 15/20* (2006.01)
    *B32B 27/20* (2006.01)
    *B32B 27/34* (2006.01)
    *B32B 3/30* (2006.01)
    *C08L 77/06* (2006.01)
    *C08K 5/098* (2006.01)
    *B29K 77/00* (2006.01)
    *B29K 705/02* (2006.01)
    *B29L 9/00* (2006.01)

(52) U.S. Cl.
    CPC .............. *B32B 27/20* (2013.01); *B32B 27/34* (2013.01); *C08K 5/098* (2013.01); *C08L 77/06* (2013.01); *B29K 2077/00* (2013.01); *B29K 2705/02* (2013.01); *B29L 2009/00* (2013.01); *C08L 2205/02* (2013.01); *C08L 2205/16* (2013.01)

(56) References Cited

U.S. PATENT DOCUMENTS

| | | | |
|---|---|---|---|
| 8,057,890 B2 | 11/2011 | Iwahashi et al. | |
| 9,545,740 B2 | 1/2017 | Naritomi et al. | |
| 9,994,678 B2 | 6/2018 | Schmidt et al. | |
| 2009/0274889 A1 | 11/2009 | Iwahashi et al. | |
| 2010/0028602 A1* | 2/2010 | Naritomi ................ | B32B 27/32 264/238 |
| 2011/0294910 A1* | 12/2011 | Kriha ..................... | B29B 9/065 521/59 |
| 2012/0165448 A1* | 6/2012 | Lee ........................ | C08L 77/00 524/451 |
| 2012/0321829 A1* | 12/2012 | Bayer ..................... | C08K 7/14 524/400 |
| 2013/0072613 A1* | 3/2013 | Miltner .................. | C08L 77/06 524/496 |
| 2013/0172453 A1* | 7/2013 | Lee ........................ | C08L 77/00 524/417 |
| 2014/0010980 A1 | 1/2014 | Hirayama et al. | |
| 2014/0171573 A1* | 6/2014 | Bayer ..................... | C08K 3/014 524/400 |
| 2014/0217064 A1 | 8/2014 | Naritomi et al. | |
| 2014/0221539 A1* | 8/2014 | Hong ..................... | C08K 3/22 524/135 |
| 2014/0329944 A1* | 11/2014 | Harder ................... | C08G 69/265 524/133 |
| 2015/0267050 A1* | 9/2015 | Briffaud ................. | C08L 77/06 524/538 |
| 2016/0145390 A1 | 5/2016 | Schmidt et al. | |
| 2016/0312027 A1 | 10/2016 | Minagawa et al. | |
| 2018/0155546 A1* | 6/2018 | Van Der Burgt ....... | C23C 18/31 |
| 2018/0327592 A1* | 11/2018 | Brule .................... | C08L 77/02 |
| 2018/0354168 A1* | 12/2018 | Van Der Burgt ....... | B32B 27/34 |
| 2019/0177537 A1* | 6/2019 | Gabriel ................. | C08G 69/265 |

FOREIGN PATENT DOCUMENTS

| | | |
|---|---|---|
| CN | 105829448 A | 8/2016 |
| JP | H05-325612 A | 12/1993 |
| JP | 2004-216425 A | 8/2004 |
| JP | 2006-315398 A | 11/2006 |
| JP | 2007-182071 A | 7/2007 |
| JP | 2013-244653 A | 12/2013 |
| JP | 2013-249363 A | 12/2013 |
| JP | 2016-528312 A | 9/2016 |
| JP | 2016-190411 A | 11/2016 |
| WO | WO-2008/081933 A1 | 7/2008 |
| WO | WO-2017/102943 A1 | 6/2017 |

OTHER PUBLICATIONS

International Searching Authority, "International Search Report," issued in connection with International Patent Application No. PCT/JP2018/039737, dated Dec. 11, 2018.

International Searching Authority, "Written Opinion," issued in connection with International Patent Application No. PCT/JP2018/039737, dated Dec. 11, 2018.

Decision of Grant for corresponding Japanese Patent Application No. 2019-550291.

Notice of Third Party Observation for corresponding Japanese Patent Application No. 2019-550291.

\* cited by examiner

METAL/RESIN COMPOSITE STRUCTURE AND MANUFACTURING METHOD OF METAL/RESIN COMPOSITE STRUCTURE

CROSS-REFERENCE TO RELATED APPLICATIONS

The present application claims priority under 37 U.S.C. § 371 to International Patent Application No. PCT/JP2018/039737, filed Oct. 25, 2018, which claims priority to and the benefit of Japanese Patent Application No. 2017-208197, filed on Oct. 27, 2017. The contents of these applications are hereby incorporated by reference in their entireties.

TECHNICAL FIELD

The present invention relates to a metal/resin composite structure and a manufacturing method of a metal/resin composite structure.

BACKGROUND ART

A technology of bonding and integrating a resin member and a metal member is required in abroad range of fields such as vehicles, communication equipment, household appliances, industrial equipment, and the like, for example.

As a technology of bonding and integrating a resin member and a metal member, a method of bonding a resin member and a metal member by performing injection molding of the resin member to the metal member inserted in a mold, which is a so-called "injection bonding method" has been proposed.

For example, a technology of performing injection and bonding of a polybutylene terephthalate resin (hereinafter, referred to as "PBT") or a polyphenylene sulfide resin (hereinafter, referred to as "PPS") as a resin member to a surface-roughened metal member has been proposed (for example, see Patent Document 1). In addition, a method of performing injection molding of a polyamide resin such as PA6 or PA66 to a surface-roughened metal member has also been proposed (see Patent Documents 2 to 4) by making a further progress in a technology of a metal surface roughening process method.

RELATED DOCUMENT

Patent Document

[Patent Document 1] Japanese Unexamined Patent Publication No. 2004-216425
[Patent Document 2] Japanese Unexamined Patent Publication No. 2006-315398
[Patent Document 3] Japanese Unexamined Patent Publication No. 2007-182071
[Patent Document 4] Pamphlet of International Publication No. 2008/081933

SUMMARY OF THE INVENTION

Technical Problem

However, according to the research of the inventors, it was clear that a bonding strength of a composite structure of a polyamide-based resin member and a metal member which is obtained by the method disclosed in Patent Documents 2 to 4 was still on an insufficient level.

For example, when a composite structure of the related art was applied to a powertrain component requiring a high rigidity at a high temperature, such as an engine mount bracket or the like which is an internal component of an automobile engine room and a component supporting the engine, a bonding strength at a high temperature may not be on a sufficient level yet and there was room for improvement.

The invention is made in consideration of these circumstances and an object thereof is to provide a composite structure of a metal and a resin in which a polyamide-based resin member is strongly bonded and stuck to a metal member.

Solution to Problem

The inventors have found that a reason for that a bonding strength of a composite structure of a polyamide-based resin member and a metal member is on the insufficient level is because sufficient fluidity so that a polyamide-based resin composition can sufficiently permeate recesses of a fine uneven structure formed on a surface of the metal member during the injection molding is not provided.

Therefore, the inventors have conducted intensive studies for designing resin quality of a polyamide-based resin component so as realize retarded recrystallization of the resin member during the injection, in order to ensure fluidity during the dissolving of the polyamide-based resin composition. As a result, the inventors have found that a metal/resin composite structure having a bonding strength between the polyamide-based resin member and the metal member which is significantly higher than that in the related art, in a case where a polyamide-based resin member having a DSC heat characteristics represented by a glass transition temperature in a specific range is used, and the invention has completed.

That is, according to the invention, a metal/resin composite structure and a manufacturing method of a metal/resin composite structure shown below are provided.

[1] A metal/resin composite structure including:
a metal member (M) having a fine uneven surface; and
a polyamide-based resin member (A) bonded to the metal member (M),
in which the polyamide-based resin member (A) satisfies the following condition [A1] and condition [A2]:
[A1] a glass transition temperature (Tg) observed by a differential scanning calorimeter (DSC) is equal to or higher than 85° C. and equal to or lower than 140° C.; and
[A2] a crystallization temperature (Tc) observed by a differential scanning calorimeter (DSC) is equal to or higher than 250° C. and equal to or lower than 292° C.

[2] The metal/resin composite structure according to [1], in which the polyamide-based resin member (A) further satisfies at least one of the following condition [A3] and condition [A4].

[A3] a semi-crystallization time $T_{1/2}$, in a case of isothermal storing at 297° C., which is measured by a differential scanning calorimeter (DSC) is 70 seconds or longer; and
[A4] a crystallization degree (xc) obtained from an enthalpy of fusion of the measurement of a differential scanning calorimeter (DSC) is equal to or less than 27%.

[3] The metal/resin composite structure according to [1] or [A2'] in which the polyamide-based resin member (A) further satisfies the following condition [A1'].

[A1'] The glass transition temperature (Tg) measured by a differential scanning calorimeter (DSC) is equal to or higher than 115° C. and equal to or lower than 140° C.

[4] The metal/resin composite structure according to any one of [1] to [3], in which the polyamide-based resin member (A) includes an inorganic filler.

[5] The metal/resin composite structure according to [4], in which a content of the inorganic filler in the polyamide-based resin member (A) is greater than 0% by mass and equal to or less than 80% by mass, in a case where the entire content of the polyamide-based resin member (A) is 100% by mass.

[6] The metal/resin composite structure according to any one of [1] to [5], in which the polyamide-based resin member (A) includes a metal soap.

[7] The metal/resin composite structure according to [6], in which a content of the metal soap in the polyamide-based resin member (A) is greater than 0.0% by mass and equal to or less than 10% by mass, in a case where the entire content of the polyamide-based resin member (A) is 100% by mass.

[8] The metal/resin composite structure according to [6] or [7], in which a content of montanic acid metal salt occupying the metal soap is equal to or more than 20% by mass and equal to or less than 100% by mass.

[9] The metal/resin composite structure according to any one of [1] to [8], in which the polyamide-based resin member (A) includes a semi-aromatic polyamide resin.

[10] The metal/resin composite structure according to [9], in which the semi-aromatic polyamide resin includes an isophthalamide skeleton-containing polyamide resin.

[11] The metal/resin composite structure according to anyone of [1] to [10], in which a skeleton derived from dicarboxylic acid of the polyamide resin configuring the polyamide-based resin member (A) is represented by General Formula (I).

[Chem. 1]

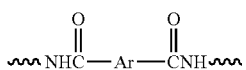

Formula (I)

(In Formula (I), Ar represents an aromatic hydrocarbon residue.)

[12] The metal/resin composite structure according to anyone of [1] to [11], in which a skeleton derived from diamine of the polyamide resin configuring the polyamide-based resin member (A) is represented by General Formula (II).

[Chem. 2]

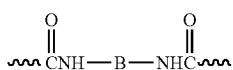

Formula (II)

(In Formula (II), B is an alkylene group.)

[13] The metal/resin composite structure according to anyone of [1] to [12], in which a tensile shear strength of a bonded surface between the metal member (M) and the polyamide-based resin member (A), which is measured under the conditions of 23° C., a distance between chucks of 60 mm, and a tensile rate of 10 mm/min by using a tensile tester, is equal to or greater than 40 MPa.

[14] The metal/resin composite structure according to [13], in which a fracture surface after the test of the tensile shear strength has a base material breakdown.

[15] The metal/resin composite structure according to anyone of [1] to [14], in which the metal member (M) includes one kind or two or more kinds selected from iron, high tensile steel, stainless steel, aluminum, aluminum alloy, magnesium, magnesium alloy, copper, copper alloy, titanium, and a titanium alloy.

[16] The metal/resin composite structure according to anyone of [1] to [15], in which the fine uneven surface of the metal member (M) includes a fine uneven surface on which the large number of protrusions having an interval period of equal to or greater than 5 nm and equal to or smaller than 500 μm are erected.

[17] A manufacturing method of the metal/resin composite structure according to any one of [1] to [16], the method including:
a step (i) of inserting the metal member (M) having the fine uneven surface to an injection molding die; and
a step (ii) of injecting a polyamide-based resin composition (a) to a surface of the inserted metal member (M), and bonding the polyamide-based resin member (A) which is a molded body of the polyamide-based resin composition (a) to the surface of the metal member (M), by causing the injected polyamide-based resin composition (a) to permeate fine recesses and protrusions of the fine uneven surface and solidifying the polyamide-based resin composition.

[18] The manufacturing method of the metal/resin composite structure according to [12], in which a temperature of the injection molding die in the step (ii) is 100° C. to 250° C.

[19] An engine mount member comprising: the metal/resin composite structure according to any one of [1] to [16].

Advantageous Effects of Invention

According to the invention, it is possible to provide a composite structure of a metal and a resin in which a polyamide-based resin member is strongly bonded and stuck to a metal member.

BRIEF DESCRIPTION OF THE DRAWINGS

The above-described object and other objects, features, and advantages will become more apparent by preferred embodiments described below and the following accompanying drawings.

DESCRIPTION OF EMBODIMENTS

Figure 1:
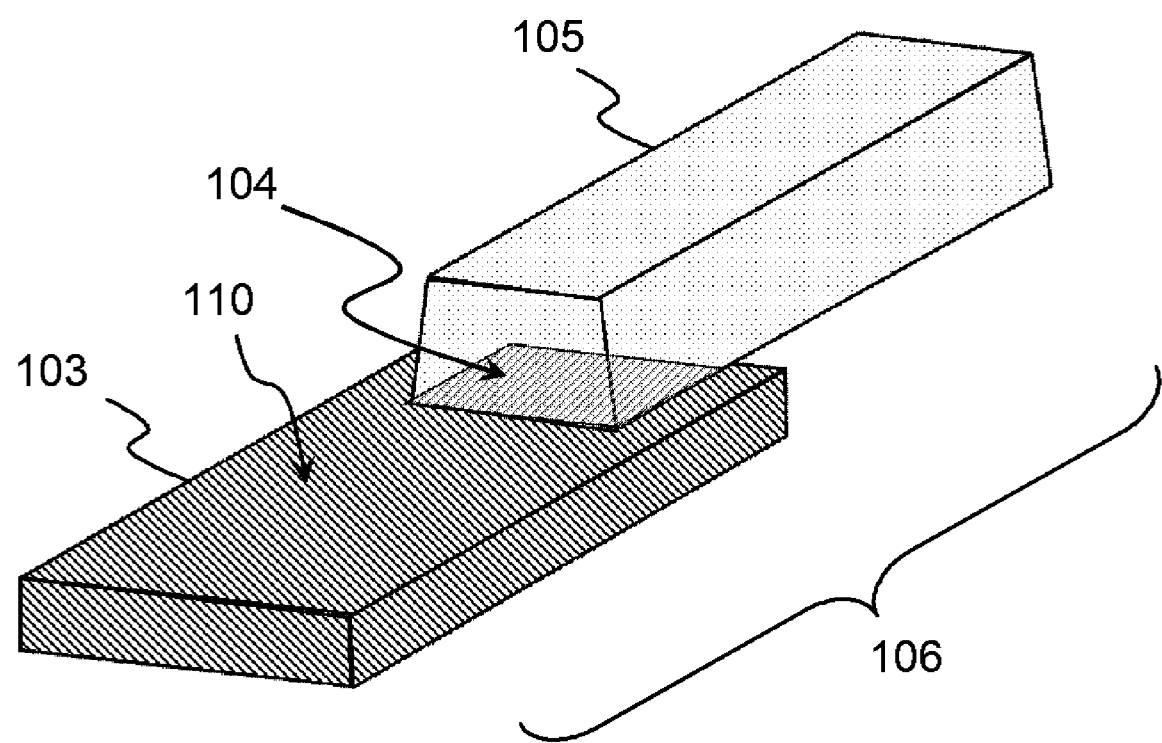
FIG. 1 is an outline view schematically showing an example of a structure of a metal/resin composite structure according to an embodiment.

Hereinafter, the embodiments of the invention will be described with reference to the drawings. In all drawings, the same reference numerals are used for the same constituent elements and the description thereof will not be repeated. A term "to" between numbers in this document means an expression "equal to or more than a certain value and equal to or less than the other value", if not otherwise specified.

FIG. 1 is an outline view schematically showing an example of a structure of a metal/resin composite structure 106 of the embodiment.

The metal/resin composite structure 106 of the embodiment is a metal/resin composite structure including: a metal member (M) having a fine uneven surface (hereinafter, also referred to as a metal member 103); and a polyamide-based resin member (A) bonded to the metal member (M) (hereinafter, also referred to as a resin member 105), in which the polyamide-based resin member (A) satisfies the following condition [A1] and condition [A2].

[A1] A glass transition temperature (Tg) observed by a differential scanning calorimeter (DSC) is equal to or higher than 85° C. and equal to or lower than 140° C.

[A2] A crystallization temperature (Tc) observed by a differential scanning calorimeter (DSC) is equal to or higher than 250° C. and equal to or lower than 292° C.

In the embodiment, the resin member 105 configuring the metal/resin composite structure 106 may be referred to as the polyamide-based resin member (A), and a resin member as a raw material before the molding may be referred to as the polyamide-based resin composition (a). The former component is different from the latter component in that heat history during the molding is applied.

Hereinafter, the polyamide-based resin member (A) and the metal member (M) having the fine uneven surface configuring the metal/resin composite structure 106, and a manufacturing method of the metal/resin composite structure 106 according to the embodiment will be described in order.

1. Polyamide-Based Resin Member (A)

An inflection point derived from a glass transition temperature (Tg) of the polyamide-based resin member (A) in the measurement of a differential scanning calorimeter (DSC) is observed, and a value thereof is equal to or higher than 85° C. and equal to or lower than 140, preferably equal to or higher than 86° C. and equal to or lower than 135° C., more preferably equal to or higher than 87° C. and equal to or lower than 130° C., and particularly preferably equal to or higher than 88° C. and lower than 130° C. (condition [A1]). Since the polyamide-based resin member (A) has Tg satisfying this range, the bonding strength of the metal/resin composite structure 106 according to the embodiment can become strong.

In a case of applying the metal/resin composite structure 106 according to the embodiment to a field requiring heat resistance higher than before, such as an engine mount bracket which is one of automobile engine mount member, for example, the inflection point derived from the glass transition temperature (Tg) of the polyamide-based resin member (A) in the measurement of differential scanning calorimetry (DSC) is observed, and a value thereof is equal to or higher than 115° C. and equal to or lower than 140, preferably equal to or higher than 117° C. and equal to or lower than 135° C., and more preferably equal to or higher than 120° C. and equal to or lower than 130° C. (condition [A1']).

In the embodiment, the temperature of the polyamide-based resin member (A) is increased from 30° C. to 300° C. at a rate of temperature increase of 10° C./min (first temperature rising), cooled to 0° C. at a rate of temperature fall of 10° C./min (temperature falling), and increased again to 300° C. at a rate of temperature increase of 10° C./min (second temperature rising), and an inflection point during the second temperature rising is set as a glass transition temperature (Tg).

The polyamide-based resin member (A) according to the embodiment satisfies the following condition [A2] at the same time, in addition to the condition [A1].

[A2] The crystallization temperature (Tc) observed by a differential scanning calorimeter (DSC) is equal to or higher than 250° C. and equal to or lower than 292° C.

That is, in the metal/resin composite structure 106, an exothermic peak based on the crystallization temperature (Tc) in the DSC measurement of the polyamide-based resin member (A) is observed, and a value thereof is equal to or higher than 250° C. and equal to or lower than 292° C., preferably equal to or higher than 255° C. and equal to or lower than 290° C., and more preferably equal to or higher than 260° C. and lower than 290° C.

Since the crystallization temperature (Tc) satisfies this range, the bonding strength of the metal/resin composite structure 106 according to the embodiment can become strong.

In the embodiment, the temperature of the polyamide-based resin member (A) is increased from 30° C. to 300° C. at a rate of temperature increase of 10° C./min (first temperature rising) and cooled to 0° C. at a rate of temperature fall of 10° C./min (first temperature falling), and a peak detected at this time is set as a crystallization temperature (Tc). In a case where two or more peaks exist during the Tc measurement, a peak on the higher temperature side is set as Tc.

The polyamide-based resin member (A) according to the embodiment preferably satisfies one or more conditions selected from the following condition [A3] and the following condition [A4] and more preferably satisfies both the following condition [A3] and the following condition [A4], in addition to the condition [A1] and the condition [A2].

[A3] A semi-crystallization time $T_{1/2}$, in a case of isothermal storing at 297° C., which is measured by a differential scanning calorimeter (DSC) is 70 seconds or longer.

[A4] A crystallization degree (xc) obtained from an enthalpy of fusion of the measurement of a differential scanning calorimeter (DSC) is equal to or less than 27%.

The semi-crystallization time $T_{1/2}$, in a case of isothermal storing at 297° C., is preferably 70 seconds or longer, more preferably 80 seconds or longer, even more preferably 90 seconds or longer, still preferably 100 seconds or longer, and particularly preferably 120 seconds or longer. Since the $T_{1/2}$ satisfies the range described above, it is possible to further improve fluidity during the molding of the polyamide-based resin composition (a). As a result, the resin easily gets into the fine uneven structure existing on the uneven surface of the metal member (M), and the bonding strength between the resin member (A) and the metal member (M) can be further improved.

In the embodiment, the semi-crystallization time $T_{1/2}$ can be measured by the following method. First, the temperature of the polyamide-based resin member (A) is increased from 30° C. to 350° C. at a set rate of 500° C./min, held for 5 minutes, and instantly decreased to 297° C. at a set rate of a rate of temperature fall of 500° C./min, and the crystallization peak under the isothermal condition is measured. Then, the time from the point when the crystallization has started to the point when the crystallization has been accelerated half way (point when the area becomes ½ with respect to the entire crystallization peak area) is calculated by using the measured crystallization peak, and the time can be set as the $T_{1/2}$.

The crystallization degree (xc) of the polyamide-based resin member (A) according to the embodiment obtained by the DSC Method is preferably less than 27% and more preferably equal to or less than 26%. Since the crystallization degree (xc) of the polyamide-based resin member (A) is in the range described above, it is possible to improve shock resistance of the polyamide-based resin member (A).

In the embodiment, the crystallization degree (xc) is a value obtained by the DSC method, and specifically, the temperature of the polyamide-based resin member (A) is increased from 30° C. to 350° C. at a rate of temperature increase of 10° C./min (first temperature rising), cooled to 0° C. at a rate of temperature fall 10° C./min, and increased again to 350° C. at a rate of temperature increase of 10° C./min (second temperature rising), and an enthalpy of fusion (ΔHf) is measured from a melt peak during the second temperature rising, and the crystallization degree can be obtained from the measurement value thereof.

In the embodiment, the crystallization degree (xc) can be obtained by dividing the measured fusion heat amount (ΔHf) by a total crystal fusion heat amount $\Delta Hf_0$ of polyamide 66 (a value of 195 mJ/mg reported in H. Lu et. al., Bull. Master. Sci., 29(5), 485(2006) is used) (Expression 1).

$$\text{Crystallization degree (\%)} = (\Delta Hf / \Delta Hf_0) \times 100 \quad \text{(Expression 1)}$$

The polyamide-based resin member (A) according to the embodiment can include an inorganic filler.

A content of the inorganic filler in the polyamide-based resin member (A) according to the embodiment is preferably more than 0% by mass and equal to or less than 80% by mass, in a case where a total content of the polyamide-based resin member (A) is 100% by mass. That is, the polyamide-based resin member (A) is preferably configured of 80% by mass or less inorganic filler and 20% by mass or more resin component. The content of the inorganic filler in the polyamide-based resin member (A) according to the embodiment is more preferably equal to or more than 1% by mass and equal to or less than 80% by mass and even more preferably equal to or more than 5% by mass and equal to or less than 70% by mass, in a case where a total content of the polyamide-based resin member (A) is 100% by mass. The content of the inorganic filler in the polyamide-based resin member (A) can be measured by a well-known analysis method such as a method of measuring an ash content after performing a combustion process of the polyamide-based resin member (A).

Examples of the inorganic filler according to the embodiment include a fiber reinforcing material such as a glass fiber or a carbon fiber; and a filling material such as mica, clay, calcium titanate, calcium carbonate, talc, glass beads, a graphite, silica, alumina, an iron powder, a ferrite, a zeolite, and activated clay. By including such inorganic fillers, it is possible to generally improve a strength, a modulus of elasticity, and a dimension stability of the polyamide-based resin member (A), and an isotropic molding shrinkage may be decreased, a warp may be prevented, and conductivity may be applied depending on the kind of the inorganic filler.

In a case where the polyamide-based resin member (A) includes the inorganic filler, as the ΔHf used in the calculation of the crystallization degree shown in Expression 1, an enthalpy of fusion (ΔHfr) derived from a resin portion (pure resin portion excluding the inorganic filler) in the polyamide-based resin member (A) to be obtained in Expression 2 can be used.

$$\Delta Hfr = \Delta Hf' / (1 - \text{content of inorganic filler (\% by mass)}/100) \quad \text{(Expression 2)}$$

In Expression 2, ΔHfr represents an enthalpy of fusion derived from the resin portion and ΔHf' represents an enthalpy of fusion obtained by the DSC measurement. In the DSC measurement, a sample having a weight of several mg including the inorganic filler can be cut out from the polyamide-based resin member (A) and set as a sample for DSC measurement.

The polyamide-based resin member (A) according to the embodiment can include a metal soap.

A content of the metal soap in the polyamide-based resin member (A) according to the embodiment is, for example, more than 0.0% by mass and equal to or less than 10% by mass, preferably equal to or more than 0.1% by mass and equal to or less than 8% by mass, and more preferably equal to or more than 0.2% by mass and equal to or less than 7% by mass, in a case where a total content of the polyamide-based resin member (A) is 100% by mass. By including the metal soap, a shear bonding strength of the metal/resin composite structure of the embodiment can be improved, and acid value deterioration of the polyamide-based resin member can be prevented. It is preferable that the content of the metal soap in the polyamide-based resin member (A) according to the embodiment is equal to or less than 10% by mass, because kneading workability of the resin composition may be improved.

The metal soap is a salt of medium chain fatty acid having 8 to 10 carbon atoms or long chain fatty acid having 12 or more carbon atoms, and a metal. Examples of fatty acid include octyl acid, lauric acid, myristic acid, palmitic acid, stearic acid, 12-hydroxystearic acid, behenic acid, montanic acid, sebacic acid, and ricinoleic acid, and the fatty acid may be dicarboxylic acid or an unsaturated carboxylic acid. As the metal, a mixed metal of one kind or two or more kinds selected from lithium, sodium, potassium, magnesium, calcium, barium, zinc, and aluminum.

Specific examples of the metal soap include lithium stearate, magnesium stearate, calcium stearate, barium stearate, zinc stearate, calcium 12-hydroxystearate, zinc 12-hydroxystearate, magnesium 12-hydroxystearate, aluminum 12-hydroxystearate, barium 12-hydroxystearate, lithium 12-hydroxystearate, calcium behenate, zinc behenate, magnesium behenate, lithium behenate, calcium montanate, zinc montanate, magnesium montanate, aluminum montanate, lithium montanate, calcium laurate, barium laurate, zinc laurate, calcium ricinoleate, barium ricinoleate, zinc ricinoleate, zinc octylate, aluminum octylate, zinc myristate, and zinc palmitate. These can be used alone or in combination of plural kinds.

In the more preferable embodiment of the embodiment, the fatty acid is one or more kinds selected from the group consisting of montanic acid, 12-hydroxystearic acid, and behenic acid, and any metal salt selected from calcium salt, magnesium salt, zinc salt, aluminum salt, and lithium salt of these fatty acids is used.

These metal salts can further improve fluidity and kneading workability of the polyamide-based resin member (A) according to the embodiment, injection moldability to the metal member (M), and work operability during the extraction of the formed metal/resin composite structure from a die, and can also contribute to the improvement of flame resistance of the polyamide-based resin member (A).

Regarding the fluidity, it is assumed that the improvement of fluidity is realized, because the metal soap functions as an internal lubricant or an external lubricant, reduces friction between polymers, and forms a lubricant layer between a metal surface and a resin. In addition, regarding the effect of the improvement of the flame resistance, it is assumed that it is because these special metal soaps promote dispersion of a metal hydrate to improve dispersibility, during high-temperature dissolving of the resin composition.

In the particularly preferable embodiment of the embodiment, a content of montanic acid metal salt occupying the metal soap is 20% by mass to 100% by mass, preferably 30% by mass to 100% by mass, and more preferably 50% by mass to 100% by mass. By setting the content thereof in such a range, the bonding strength of the metal/resin composite structure according to the embodiment can be increased.

In addition to the components described above, the polyamide-based resin member (A) according to the embodiment can include various additives normally used, for example, one or more kinds of a colorant, an antioxidant, a heavy metal deactivator (a chelating agent), a flame retardant aid, an ultraviolet absorber, a heat stabilizer, an antistatic agent, an antibacterial agent, an antifogging agent, an antiblocking agent, a nucleating agent, a dispersing agent, a thickener, a foaming agent, a pigment, a dye, and an organic filler, if necessary, within a range not negatively affecting the effect to the invention. In a case where the polyamide-based resin member (A) according to the embodiment includes these additives, a total content of these is, for example, equal to or less than 5% by mass, preferably equal to or less than 3% by mass, and more preferably equal to or less than 2% by mass, in a case where a total content of the polyamide-based resin member (A) is 100% by mass.

The polyamide-based resin member (A) according to the embodiment preferably includes a semi-aromatic polyamide resin. In the polyamide-based resin member (A) according to the embodiment, a content of the semi-aromatic polyamide resin is preferably equal to or more than 3% by mass, more preferably equal to or more than 5% by mass, and even more preferably equal to or more than 10% by mass, in a case where a total content of the resin component occupying the polyamide-based resin member (A) is 100% by mass. An upper limit value of the content of the semi-aromatic polyamide resin in the polyamide-based resin member (A) according to the embodiment is not particularly limited, and is, for example, equal to or less than 100% by mass.

The polyamide-based resin member (A) according to the embodiment can also include the semi-aromatic polyamide resin as a main component.

After performing solvent extraction of the resin from the polyamide-based resin member (A), the observation of existence of the semi-aromatic polyamide resin and the measurement of the content thereof can be performed by a well-known analysis method such as an infrared absorption spectrum analysis or nuclear magnetic resonance spectrum analysis of the remainder after solvent distillation. The "main component" in the embodiment is defined as a constituent component having a content greater than 50% by mass among the resin components occupying the polyamide-based resin member (A).

In the embodiment, the semi-aromatic polyamide resin is defined as all polyamide resins excluding a wholly aliphatic polyamide resin and a wholly aromatic polyamide resin. Here, the wholly aliphatic polyamide resin is defined as a polyamide resin in which all of constituting units linked to an amide bond is saturated hydrocarbon skeletons, and the wholly aromatic polyamide resin is defined as a polyamide resin in which all of constituting units linked to an amide bond is an aromatic skeleton (arylene group).

Examples of the semi-aromatic polyamide resin according to the embodiment include polyhexamethylene isophthalamide (polyamide 6I), a polyhexamethylene terephthalamide/polycaproamide copolymer (polyamide 6T/6), a polyhexamethylene adipamide/polyhexamethylene isophthalamide copolymer (polyamide 66/6I), a polyhexamethylene isophthalamide/polycaproamide copolymer (polyamide 6I/6), a polydodecamide/polyhexamethylene terephthalamide copolymer (polyamide 12/6T), a polyhexamethylene adipamide/polyhexamethylene terephthalamide/polyhexamethylene isophthalamide copolymer (polyamide 66/6T/6I), a polyhexamethylene adipamide/polycaproamide/polyhexamethylene isophthalamide copolymer (polyamide 66/6/6I), a polyhexamethylene isophthalamide/polyhexamethylene terephthalamide copolymer (polyamide 6I/6T), a polyhexamethylene terephthalamide/poly (2-methylpentamethylene terephthalamide) copolymer (polyamide 6T/M5T), polynonanemethylene terephthalamide (polyamide 9T), a polynonanemethylene terephthalamide/polyoctanemethylene terephthalamide copolymer (polyamide 9T/8T), a poly (2-methylpentamethylene terephthalamide)/poly(2-methylpentamethylene isophthalamide) copolymer (polyamide M5T/M5I), polymetaxylylene adipamide (polyamide MXD6), and a mixture or copolymerized polyamide of these. In the simple names in brackets, the number represents the carbon number, T represents the terephthalic acid unit, and I represents the isophthalic acid unit. In the polyamide, polyamide 6I/6T indicates a case in which a content of the isophthalic acid unit is greater than a content of the terephthalic acid unit, and is clearly distinguished from the other polyamide (PA6T/6I).

As the semi-aromatic polyamide resin according to the embodiment, an isophthalamide skeleton-containing polyamide resin is preferably included. A dicarboxylic acid unit of the isophthalamide skeleton-containing polyamide resin according to the embodiment is isophthalic acid, and a diamine unit is an aliphatic diamine.

That is, it is also preferable that one kind or two or more kinds of semi-aromatic polyamide resin selected from polyamide 6I, polyamide 66/6I, polyamide 6I/6, polyamide 66/6T/6I, polyamide 66/6/6I, polyamide 6I/6T, and polyamide M5T/M5I are included in the exemplified semi-aromatic polyamide resin. The existence and the content of the isophthalamide skeleton can be confirmed and measured by quantification of an aromatic proton peak interposed between amide groups which is detected in the vicinity of 8 ppm in a $^1$H-NMR spectrum.

As a polyamide resin (in the following description, may be abbreviated as a remaining resin) configured with the polyamide-based resin member (A) according to the embodiment, other than the semi-aromatic polyamide resin exemplified above, one kind or two or more kinds selected from polyamide 6T, polyamide 66/6T, and polyamide 6T/6I are preferable. From viewpoints that heat characteristics of the polyamide-based resin member (A) according to the embodiment satisfy the conditions [A1] and [A2] and the effect of the invention is easily exhibited, a content of one kind or two or more kinds selected from polyhexamethylene terephthalamide (polyamide 6T), a polyhexamethylene adipamide/polyhexamethylene terephthalamide copolymer (polyamide 66/6T), and a polyhexamethylene terephthalamide/polyhexamethylene isophthalamide copolymer (polyamide 6T/6I) occupying the remaining resin is preferably equal to or more than 50% by weight, more preferably equal to or more than 70% by weight, and even more preferably equal to or more than 90% by weight, and it is particularly preferable that the entirety of the remaining resin is the one kind or two or more kinds selected from polyamide 6T, polyamide 66/6T, and polyamide 6T/6I.

In the polyamide-based resin member (A), from viewpoints of improving heat resistance of the metal/resin composite structure 106 according to the embodiment and suitably applying the metal/resin composite structure to a field requiring higher heat resistance, a skeleton derived from dicarboxylic acid of the polyamide resin configuring the polyamide-based resin member (A) is preferably represented by General Formula (I).

[Chem. 3]

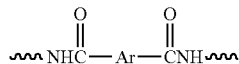

Formula (I)

In Formula (I), Ar represents an aromatic hydrocarbon residue. Examples of the aromatic hydrocarbon residue include a 1,4- or 1,3-phenylene group, 2,4-toluylene group, 1,4-, 1,5-, 2,6- or 2,7-naphthylene group, and 4,4'-biphenylene group. In these aromatic hydrocarbon residues, the 1,3- or 1,4-phenylene group is preferable, from viewpoints of availability and economic efficiency. That is, from viewpoints of improving heat resistance of the metal/resin composite structure 106 according to the embodiment and suitably applying the metal/resin composite structure to a field requiring higher heat resistance, for example, the amount of a skeleton derived from adipic acid as the aliphatic dicarboxylic acid represented by Formula (III) is preferably small as possible. More specifically, a content of a group Ar represented by Formula (I) depends on a requiring level of heat resistance to the polyamide-based resin member (A), and is, for example, equal to or more than 95 mol %, preferably equal to or more than 97 mol %, more preferably equal to or more than 98 mol %, and particularly preferably equal to or more than 99 mol % of a total content of the dicarboxylic acid-derived skeleton. The content of the group Ar close to 100% contributes to not only the improvement of heat resistance to the polyamide-based resin member, but also the improvement of the bonding strength of the composite.

[Chem. 4]

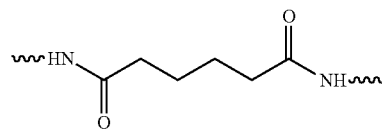

Formula (III)

In order to set the aromatic hydrocarbon residue (Ar) represented by Formula (I) as the skeleton derived from the dicarboxylic acid of the polyamide resin configuring the polyamide-based resin member (A), for example, aromatic dicarboxylic acid may be used as dicarboxylic acid, when producing the polyamide resin. Examples of the aromatic dicarboxylic acid include terephthalic acid, isophthalic acid, 2-methylterephthalic acid, naphthalenedicarboxylic acid, and 4,4'-biphenyldicarboxylic acid, and by using this as a raw material component, a polyamide resin in which the group Ar in Formula (I) each represent a 1,4-phenylene group, a 1,3-phenylene group, a 2-methyl-1,4-phenylene group, a naphthylene group, and a 4,4'-biphenylene group is obtained.

In the polyamide-based resin member (A), from viewpoints of improving heat resistance of the metal/resin composite structure 106 according to the embodiment and suitably applying the metal/resin composite structure to a field requiring higher heat resistance, a skeleton derived from diamine of the polyamide resin configuring the polyamide-based resin member (A) is preferably represented by General Formula (II).

[Chem. 5]

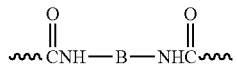

Formula (II)

In Formula (II), B is an alkylene group and is preferably a linear alkylene group. Examples of the linear alkylene group include a 1,3-propylene group, a 1,4-butylene group, a 1,5-pentylene group, a 1,6-hexylene group, a 1,7-heptylene group, a 1,8-octylene group, a 1,9-nonenylene group, a 1,10-decenylene group, a 1,11-undecenylene group, and a 1,12-dodecenylene group, and each of these linear alkylene group can be obtained by a polycondensation reaction of 1,3-propanediamine, 1,4-butanediamine, 1,5-pentanediamine, 1,6-hexanediamine, 1,7-heptanediamine, 1,8-octanediamine, 1,9-nonanediamine, 1,10-decanediamine, 1,11-undecanediamine, 1,12-dodecanediamine, and dicarboxylic acid.

The group B can include a branched alkylene group, in addition to the linear alkylene group, and a concentration of the branched alkylene group occupying the total amount of the group B is, for example, equal to or less than 20 mol %, preferably equal to or less than 10 mol %, more preferably equal to or less than 5 mol %, particularly preferably 2 mol %, and especially preferably equal to or less than 1 mol %. Examples of such a branched alkylene group include a 2-methyl-1,5-pentylene group, a 2-methyl-1,6-hexylene group, a 2-methyl-1,7-heptylene group, a 2-methyl-1,8-octylene group, a 2-methyl-1,9-nonenylene group, a 2-methyl-1,10-decenylene group, and a 2-methyl-1,11-undecenylene group. The fact that the B includes the branched alkylene group means that tertiary carbon atoms are included in a molecular skeleton. The existence of such tertiary carbon atoms is a reason for increasing a probability of a hydrogen extraction reaction at a high temperature and deteriorating heat aging resistance, and accordingly, the amount of the tertiary carbon is preferably small as possible. In addition, the existence of the branched skeleton may decrease the crystallization to decrease a mechanical strength. Due to the two reasons described above, a concentration of the branched alkylene group occupying the group B is preferably equal to or less than 20 mol %.

From a viewpoint of availability of the raw material, as the group B, a 1,6-hexylene group and a 1,9-nonenylene group each derived from 1,6-hexanediamine and 1,9-nonanediamine as the diamine component are preferable.

2. Metal Member (M) Having Fine Uneven Surface

Hereinafter, the metal member (M) according to the embodiment will be described.

A metal material configuring the metal member (M) is not particularly limited, and examples thereof include iron, high-tensile steel, stainless steel, aluminum, an aluminum alloy, magnesium, a magnesium alloy, copper, a copper alloy, titanium, and a titanium alloy. These may be used alone or in combination of two or more kinds thereof.

Among these, from a viewpoint of a light weight and high strength, aluminum (aluminum single substance) and an aluminum alloy are preferable, and an aluminum alloy is more preferable. In addition, from a viewpoint of high strength, iron and high-tensile steel are preferable. As the aluminum alloy, alloy Nos. 1050, 1100, 2014, 2024, 3003, 5052, 6061, 6063, 7075, and the like standardized by JIS H4000 are preferably used.

A shape of the metal member (M) is not particularly limited, as long as it can be bonded to the resin member 105, and examples thereof include a flat plate shape, a curved plate shape, a rod shape, a tube shape, or a lump shape. A structure obtained by combining these with each other may be used.

A shape of a bonding portion surface 104 to be bonded to the resin member 105 is not particularly limited, and a flat surface or a curved surface is used.

It is preferable that the metal member (M) is subjected to a roughening treatment which will be described later, after being processed to the predetermined shape, by removing processing such as plastic processing, punching processing, cutting, polishing, or electrical discharge machining performed by cutting or pressing of the metal material. That is, a member which is processed to a necessary shape by various processing methods is preferably used.

In the metal member (M) processed to a necessary shape, in a case where rust which is an oxidized coating is clearly observed on a surface due to natural standing for a long period of time, the rust is preferably removed by polishing or a chemical treatment.

The metal member (M) according to the embodiment preferably has a fine uneven surface structure, in which the large number of protrusions having an interval period of equal to or greater than 5 nm and equal to or smaller than 500 μm are erected, at least on a portion in contact with the resin member 105 (also referred to as the bonding portion surface 104). Here, in the embodiment, the surface on which the fine uneven structure is formed is also referred to as a fine uneven structure.

By doing so, the resin member 105 according to the embodiment gets into the fine recesses and protrusions on the surface of the metal member (M), and accordingly, it is possible to further improve the bonding strength between the metal member (M) and the resin member 105. In a case where the interval period of the protrusions is equal to or more than the lower limit value described above, the resin member 105 can sufficiently permeate the recesses of the uneven structure, and as a result, it is possible to further improve the bonding strength between the metal member (M) and the resin member 105. In addition, in a case where the interval period of the protrusions is equal to or less than the upper limit value, it is possible to further prevent occurrence of a gap of a metal-resin interface of the metal/resin composite structure 106 to be obtained. As a result, it is possible to prevent the penetration of impurities such as moisture from the gap of the metal-resin interface, thereby further preventing a decrease in strength, in a case where the metal/resin composite structure 106 is used at a high temperature and high humidity.

The interval period on the uneven surface is an average value of distances between protrusions and adjacent protrusions and can be obtained by removing the resin member 105 from the metal/resin composite structure 106 according to the embodiment by suitably combining well-known methods such as mechanical peeling and solvent washing, and observing the exposed surface of the metal member (M) with an electron microscope or a laser microscope, or by using a surface roughness measurement device.

Specifically, regarding an ultrafine uneven structure having the interval period less than 500 nm, the measurement can be performed by an electron microscope, and regarding the fine uneven structure having the interval period greater than 500 nm, the value can be obtained by using a laser microscope or a surface roughness measurement device, but there is no limitation. In a case of obtaining the interval period from an image captured with an electron microscope or a laser microscope, specifically, a surface 110 of the metal member (M) is imaged. From this image, 50 random protrusions are selected and distances between the protrusions and adjacent protrusions are respectively measured. A value obtained by dividing the sum of all of the distances between the protrusions and adjacent protrusions, by 50 is set as the interval period.

In the embodiment, it is preferable that the ultrafine uneven structure having the interval period less than 500 nm is observed on the fine uneven surface of the metal member (M), or the ultrafine uneven structure having the interval period less than 500 nm is not observed and the fine uneven structure in which the large number of protrusions having an average length (RSm) of a rough curve element equal to or more than 0.5 μm and equal to or less than 500 μm are erected is formed on the fine uneven surface of the metal member (M). It is because that the bonding strength is effectively exhibited by satisfying this condition. In order that the metal member (M) satisfies the condition described above, a metal member satisfying the condition described above may be used as the metal member (M) to be bonded to the polyamide-based resin composition (a). The determination whether using a metal member (m-2) satisfying the former condition or using a metal member (m-1) satisfying the latter condition is arbitrarily determined according to production facility such as a metal surface treatment device of a person skilled in the art, and from a viewpoint of the bonding strength, the latter metal member (m-1) in which the ultrafine uneven structure having the interval period less than 500 nm is not observed and the fine uneven structure in which the large number of protrusions having an average length (RSm) of a rough curve element equal to or more than 0.5 μm and equal to or less than 500 μm are erected is formed, is preferably used.

As a method of forming the fine uneven surface having the interval period, various well-known methods can be used. Examples thereof include a method of using laser processing disclosed in Japanese Patent No. 4020957; a method of immersing a metal member in an inorganic base aqueous solution such as NaOH and/or an inorganic acid aqueous solution such as HCl or $HNO_3$; a method of processing a metal member by an anodic oxidation method disclosed in Japanese Patent No. 4541153; a substitution crystallization method of performing etching by an acid etching agent, preferably, an acidic etching agent aqueous solution including inorganic acid, ferric ion, cupric ion, and if necessary, manganese ion or aluminum chloride hexahydrate, or sodium chloride, disclosed in Pamphlet of International Publication No. WO2015-8847; a method of immersing a metal member in one or more kinds of aqueous solution selected from hydrated hydrazine, ammonia, and a water-soluble amine compound (hereinafter, may be referred to as an NMT method) disclosed in Pamphlet of International Publication No. WO2009/31632, and a hot water treatment method disclosed in Japanese Unexamined Patent Publication No. 2008-162115. In these methods, the etching method can be randomly divided according to the metal kind of the metal material used or the uneven shape formed in the range of the interval period, and from a viewpoint of the bonding strength between the metal member (M) and the resin member 105, in the embodiment, the surface treatment performed by the substitution crystallization method or the surface treatment performed by the NMT method are preferable, and the substitution crystallization method is more preferable among these.

In the preferable aspect of the embodiment, an average value of a ten point average roughness (Rz) at an evaluated length of 4 mm measured regarding six linear portions in total including three random linear portions parallel with each other and three random linear portions orthogonal to the above three linear portions on a surface 110 of the metal member (M), based on JIS B0601 (corresponding international standard: ISO4287), is preferably more than 2 μm, more preferably more than 2 μm and equal to or less than 50 μm, and even more preferably more than 2.5 μm and equal to or less than 45 μm.

3. Manufacturing Method of Metal/Resin Composite Structure

The metal/resin composite structure 106 according to the embodiment includes the polyamide-based resin member (A) and the metal member (M) having the fine uneven surface, and a tensile shear strength of a bonded surface between the metal member (M) and the polyamide-based resin member (A), which is measured under the conditions of 23° C., a distance between chucks of 60 mm, and a tensile rate of 10 mm/min by using a tensile tester, is preferably equal to or greater than 40 MPa, and a fracture surface after the test of the tensile shear strength preferably has a base material breakdown aspect. The base material breakdown is defined as a breakdown aspect in which the remaining resin is observed on 80 area % or more of the interface of the metal/resin bonded portion.

The tensile shear strength is more preferably equal to or greater than 42 MPa, even more preferably equal to or greater than 45 MPa, still preferably equal to or greater than 47 MPa, and particularly preferably 47 to 70 MPa.

The manufacturing method of the metal/resin composite structure 106 is preferably performed by an injection molding method including the following steps (i) and (ii).

(i) An insertion step of inserting the metal member (M) having the fine uneven surface in a mold (ii) A bonding step of performing injection filling of the polyamide-based resin composition (a) to at least the fine uneven surface of the inserted metal member (M), and bonding the polyamide-based resin member (A) to the surface of the metal member (M), by causing a part of the polyamide-based resin composition (a) to permeate the fine uneven structure of the fine uneven surface and cooling the die and solidifying the polyamide-based resin composition This will be described in detail, hereinafter. A preparation method of the metal member (M) having the fine uneven surface has been described above, and therefore, the description thereof will not be repeated here.

First, in the step (i), a die is prepared, the die is opened, and the metal member (M) having the fine uneven surface is installed in a cavity portion (space portion). Then, in the step (ii), after the step (i), the die is closed, the polyamide-based resin composition (a) is injected and solidified in the cavity portion of the die, so that at least a part of the polyamide-based resin composition (a) is in contact with the uneven surface of the metal member (M), and accordingly, the metal member (M) and the resin member 105 are bonded to each other. After the injection and dwelling, the die is cooled. Then, the mold opening is performed, and by performing the ejection using an ejector pin, if necessary, the metal/resin composite structure 106 can be obtained. As the die, a generally-used die for injection molding can be used, and a die for high-speed heat cycle molding (RHCM, heating and cooling molding) or a core back die for foam molding which will be described later may be used.

Here, in the step (ii), it is preferable that a surface temperature of the die is maintained to be preferably equal to or higher than the glass transition temperature (hereinafter, also referred to as Tg) and lower than a melting point (Tm) of the resin member 105, from the injection start of the polyamide-based resin composition (a) to the completion of the dwelling.

Accordingly, it is possible to contact the polyamide-based resin composition (a) at a high pressure for a longer period of time, while maintaining the polyamide-based resin composition (a) in a flowable state. As a result, the resin can flow and permeate the recesses and protrusions on the metal surface, the adhesiveness between the surface of the metal member (M) and the resin member 105 can be improved, and as a result, it is possible to more stably obtain the metal/resin composite structure 106 having even more excellent bonding strength.

In the embodiment, a cylinder temperature of the polyamide-based resin composition (a) in the step (ii) is preferably 290° C. to 360° C., more preferably 300° C. to 350° C., and even more preferably 310° C. to 340° C. A die temperature in the step (ii) is preferably 100° C. to 250° C., more preferably 100° C. to 230° C., even more preferably 120° C. to 230° C., still preferably 120° C. to 220° C., still more preferably 130° C. to 220° C., still even more preferably 130° C. to 200° C., and particularly preferably 150° C. to 190° C.

In the step (ii), the time from the injection start to the completion of the dwelling is preferably equal to or longer than 1 seconds and equal to shorter than 60 seconds and more preferably equal to or longer than 5 seconds and equal to shorter than 50 seconds.

In a case where the time is equal to or longer than the upper limit value, the polyamide-based resin composition (a) can come into contact with the uneven surface of the metal member (M) at a high pressure for a longer period of time, while maintaining the polyamide-based resin composition (a) in a melted state. Therefore, it is possible to more stably obtain the metal/resin composite structure 106 having even more excellent bonding strength.

In addition, in a case where the time is equal to or shorter than the upper limit value, the molding cycle of the metal/resin composite structure 106 can be shortened, and therefore, it is possible to more efficiently obtain the metal/resin composite structure 106.

In the step (ii), the die cooling is performed for performing the solidifying by cooling the polyamide-based resin composition (a) bonded to the metal member (M) at a specific temperature for a certain period of time, after the injection, filling, and the dwelling. As a temperature controlling method of the die temperature, and a method of circulating a medium controlled to a certain temperature or a method of controlling the temperature to a specific temperature using a cartridge heater or the like can be used as typical examples.

The die temperature during the cooling depends on a cylinder temperature or a nozzle temperature, and is preferably 100° C. to 250° C. and more preferably 100° C. to 230° C. In a case where the temperature is equal to or higher than 100° C., it is possible to bring the polyamide-based resin composition (a) into contact with the uneven surface of the metal member (M) at a high pressure for a longer period of time, while maintaining the polyamide-based resin composition (a) in a melted state. Therefore, it is possible to more stably obtain the metal/resin composite structure 106 having even more excellent bonding strength.

In addition, in a case where the temperature is equal to or lower than the upper limit value, the molding cycle of the metal/resin composite structure 106 can be shortened, and therefore, it is possible to obtain the metal/resin composite structure 106 with more excellent productivity.

As the molding method which can be applied to the manufacturing method of the metal/resin composite structure 106 according to the embodiment, a transfer molding method, a compression molding method, pressure bonding molding, a reaction injection molding method, a blow molding method, a thermoforming method, and a press molding method can be randomly applied, in addition to the injection molding method.

The injection molding method may be used in combination of other molding methods, and specific examples of such molding methods include foam molding (MuCell foam molding, chemical foam molding), core back molding, foam core back molding, high-speed heat cycle molding (RHCM molding, heating and cooling molding).

The metal/resin composite structure 106 according to the embodiment can be developed for various purposes, due to a high productivity and a high degree of freedom of shape controlling.

In addition, the metal/resin composite structure 106 according to the embodiment exhibits high heat resistance, mechanical properties, friction resistance, sliding properties, airtightness, and watertightness, and accordingly, the metal/resin composite structure can be suitably used for the purpose according to these properties.

Examples thereof include the purpose for household goods such as structural components for a car, car-mounted components, a housing of an electronic device, a housing of an household electrical appliance, structural components, mechanical components, components for various vehicles, components for an electronic device, furniture, or kitchenware, medical equipment, components of construction materials, other structural components or exterior components.

More specifically, examples thereof include the following components which are designed so that a portion having insufficient strength just with the resin, is supported by the metal. In vehicles, an instrument panel, a console box, door knobs, door trim, a shift lever, pedals, a glove box, a bumper, a hood, fenders, a trunk, doors, a roof, a pillar, seats, a steering wheel, an ECU box, electrical parts, engine peripheral parts, driving system—gear peripheral parts, intake—exhaust system parts, and cooling system parts are used. In construction or household goods, glass window frames, handrails, curtain rail, a chest of drawers, and drawer, closet, a bookshelf, a desk, and a chair are used. A connector, a relay, and gears are used as precise electronic components. A transport container, a suitcase, and a trunk are used as transportation containers.

The composite structure can be used for a component used in a machine designed to have optimal heat management by combining thermal conductivity of the metal member (M) and the heat insulating properties of the resin member 105, for example, and various electric appliances. Household appliances such as a refrigerator, a washing machine, a vacuum cleaner, a microwave oven, an air conditioner, lighting equipment, an electric kettle, a TV, a clock, a ventilating fan, a projector, and speakers, and electronic information devices such as a computer, a mobile phone, a smart phone, a digital camera, a tablet PC, a portable music player, a portable game machine, a charger, and a battery are used.

For other uses, toys, sports equipment, shoes, sandals, bags, tableware such as forks, knives, spoons, and dishes, stationery such as a ball pen or a pacer, a file, and a binder, cookware such as a pan or a pot, a kettle, a spatula, a ladle, a perforated ladle, a whisk, and a tong, components for lithium ion secondary battery, and a robot are used.

In addition, since the resin member 105 includes polyamide, the metal/resin composite structure 106 according to the embodiment has excellent mechanical properties and wear resistance. Therefore, the metal/resin composite structure is very useful as a sliding component for dynamic applications such as a gear, a bush, or an arm for a door checker.

The metal/resin composite structure 106 according to the embodiment is useful as a bracket configuring an engine mount member vibration control supporting an engine (vibration member) with respect to a support member. The engine mount member, formed on the bracket, in which the polyamide-based resin composition (a) is integrally molded on an insert fastening fitting for fixing to the vibration member and/or the supporting member, or a metal stiffening rib embedded in a bracket main body for improving a strength, is obtained by forming the fine uneven surface on the surface of the fastening fitting or the metal stiffening rib and performing the insert molding of the polyamide-based resin composition (a). The engine mount member according to the embodiment includes a bracket portion having a high bonding strength and heat resistance and has high vibration properties, and thus can effectively withstand the vibration of the engine and the like.

Hereinabove, the usage of the metal/resin composite structure 106 according to the embodiment has been described, but these are merely examples of the usage, and the metal/resin composite structure can be used for various other usages.

EXAMPLES

Hereinafter, the embodiments will be described in detail with reference to examples and comparative examples. The embodiments are not limited to these examples. The evaluation methods of physical properties and the injection molding method are as described below.

First, an analysis method of heat properties of the polyamide-based resin member (A), an analysis method of the fine uneven shape on the surface of the metal member (M), and a measurement method of the bonding strength of the metal/resin composite structure will be described.

(Analysis of Heat Properties of Polyamide-Based Resin Member (A))

Apart of the polyamide-based resin member (A) after a bonding strength evaluation test which will be described later was cut to have a sample for analysis of heat properties. This sample was dried in a vacuum state in a vacuum oven at 110° C. for 12 hours, and a glass transition temperature (Tg), a melting point (Tm), a crystallization temperature (Tc), an enthalpy of fusion ($\Delta$Hf), a semi-crystallization time ($T_{1/2}$), and a crystallization degree (xc) were respectively obtained by using a differential scanning calorimeter (manufactured by SII, X-DSC 7000).

The temperature was increased from 30° C. to 300° C. at a rate of temperature increase of 10° C./min (first temperature rising), cooled to 0° C. at a rate of temperature fall of 10° C./min (first temperature falling), and increased again to 300° C. at a rate of temperature increase of 10° C./min (second temperature rising). An inflection point during the second temperature rising was set as the glass transition temperature (Tg), a peak during the first temperature falling was set as the crystallization temperature (Tc), and a melt peak during the second temperature rising was set as the melting point (Tm). In a case where two or more peaks exist during the measurement of Tc or Tm, a peak observed on the higher temperature side was respectively considered as Tc and Tm. In addition, ΔHf or ΔHf' was calculated form the peak area derived by Tm.

$T_{1/2}$ was measured by the following method. First, the temperature was increased from 30° C. to 350° C. at a set rate of 500° C./min, held for 5 minutes, and instantly decreased to 297° C. at a set rate of a rate of temperature fall of 500° C./min, and the crystallization peak under the isothermal condition was measured. Then, the time from the point when the crystallization has started to the point when the crystallization has been accelerated half way (point when the area becomes ½ with respect to the entire crystallization peak area) was calculated by using the measured crystallization peak, and the value thereof can be set as the $T_{1/2}$.

The xc is a value obtained by dividing the value of the enthalpy of fusion (ΔHf or ΔHfr) obtained by the method described above by a total crystal fusion heat amount (195 mJ/mg) of polyamide 66.

(Analysis of Fine Uneven Shape of Metal Member (M)) Interval Period

A measurement method of the interval period on the surface of the metal member (M) having the fine uneven surface will be described. As described above, the ultrafine uneven surface having the interval period less than 500 nm is measured with an electron microscope. In the embodiment, the measurement was performed using a laser microscope (VK-X100 manufactured by KEYENCE) or a scanning electron microscope (JSM-6701F manufactured by JEOL). In a case of obtaining the interval period from an image captured with the electron microscope or the laser microscope, specifically, the surface 110 of the metal member (M) is imaged. From this image, 50 random protrusions are selected and distances between the protrusions and adjacent protrusions are respectively measured. A value obtained by dividing the sum of all of the distances between the protrusions and adjacent protrusions, by 50 was set as the interval period.

Ten Point Average Roughness (Rz)

A ten point average roughness (Rz) measured based on JIS B0601 (corresponding ISO4287) was measured by using a surface roughness measurement device "SURFCOM 1400D (manufactured by Tokyo Seimitsu Co., Ltd.)". The measurement conditions are as follows.

Figure 3:
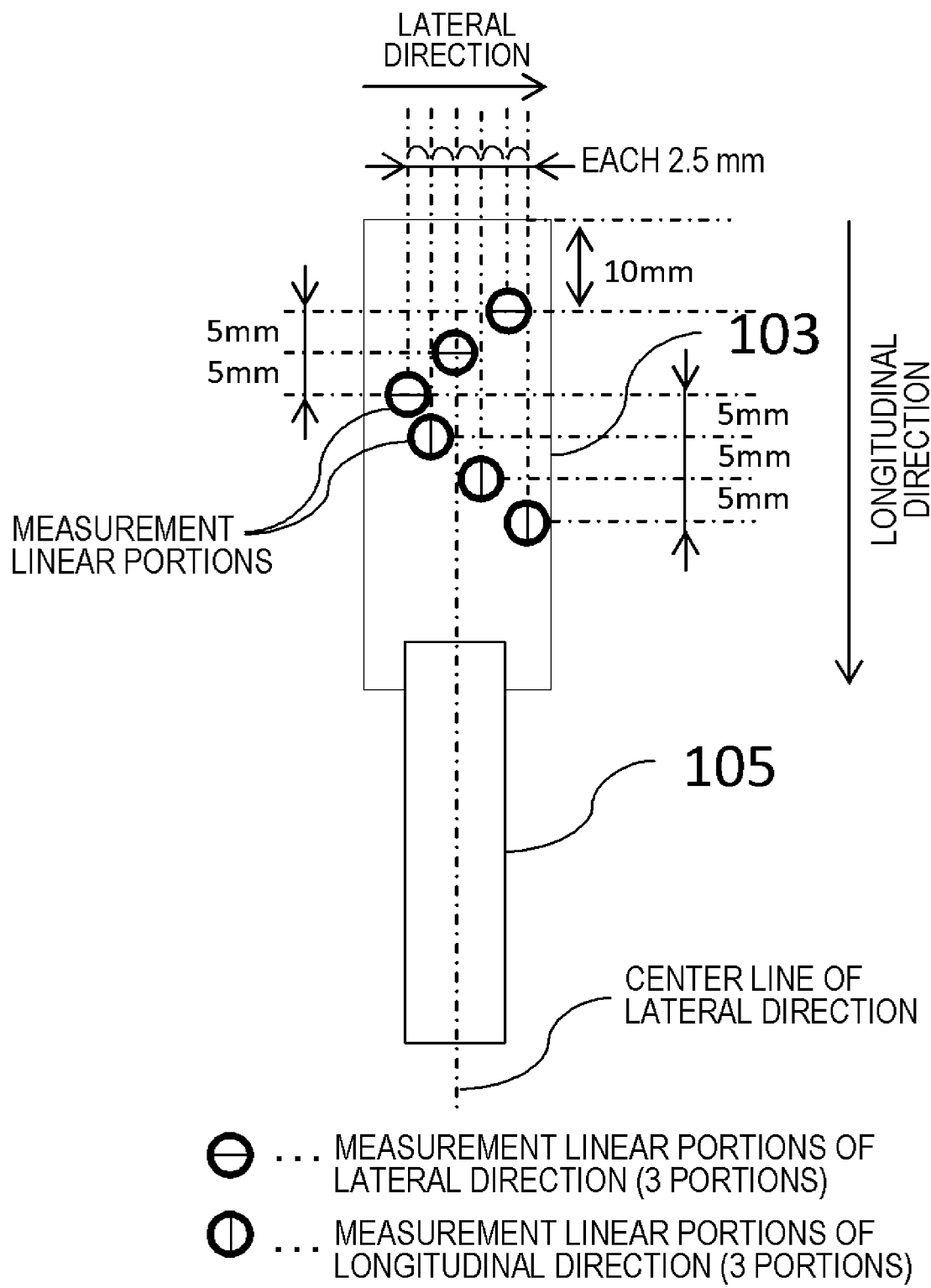
FIG. 3 is a schematic view for explaining measurement portions of six linear portions in total including three random linear portions parallel with each other and three random linear portions orthogonal to the above three linear portions on a surface of a metal member according to the embodiment.

Probe tip radius: 5 μm
Reference length: 0.8 mm
Evaluated length: 4 mm
Measurement speed: 0.06 mm/sec The measurement was performed regarding six linear portions in total including three random linear portions parallel with each other and three random linear portions orthogonal to the above linear portions on the surface of the metal member (M), and an average value thereof was obtained (see FIG. 3).

(Bonding Strength Measurement Method of Metal/Resin Composite Structure

The measurement was performed using a tensile strength tester "model 1323 (manufactured by Aikoh Engineering Co., Ltd.)" and attaching a dedicated jig to the tensile strength tester, under conditions of room temperature (23° C.), a distance between chucks of 60 mm, and a tensile rate of 10 mm/min. The bonding strength (tensile shear strength) (MPa) was obtained by dividing a breaking weight (N) by an area of the metal/resin bonded portion.

(Fracture Morphology Observation)

A side surface of the metal member after the measurement of the bonding strength by the tensile strength tester was observed with a magnifier and determined with the following standards. That is, a case where the resin residue is observed in the area which is 80 area % or more of the metal side interface of the metal/resin bonded portion was set as base material breakdown (may be abbreviated as "base breakdown"), a case where the resin residue is observed in the area which is 30 area % or more and less than 80 area % of the interface was set as a partial base material breakdown 1 (may be abbreviated as "base breakdown 1"), a case where the resin residue is observed in the area which is less than 30 area % of the interface was set as a partial base material breakdown 2 (may be abbreviated as "base breakdown 2"), and a case where the resin residue is not observed over the entire interface was set as interface breakdown (may be abbreviated as "interface breakdown").

(Raw Material for Polyamide-Based Resin Composition (A))

As a commercially available polyamide resin for preparing the polyamide-based resin composition (a), PA6T/6I (product name: ARLEN A335, manufactured by Mitsui Chemicals), PA66/6T (product name: ARLEN C235, manufactured by Mitsui Chemicals), and PA6I/6T (product name: GRIVORY™ G16, manufactured by EMS-CHEMIE AG) were used.

In addition, as a neat resin for composition preparation, a synthetic polyamide resin obtained by a method of Synthesis Example 1 was used.

In the following description, ARLEN A335 may be simply abbreviated as A335, ARLEN C235 may be simply abbreviated as C235, GRIVORY™ G16 may be simply abbreviated as G16, and the synthetic polyamide resin may be simply abbreviated as PA (S).

An analysis value of each polyamide resin in a pellet form when received was as follows.

(A335)
Glass fiber: containing 35% by mass
Tg=125° C.
Tm=320° C.
(C235)
Glass fiber: containing 35% by mass
Tg=77° C.
Tm=306° C.
(G16)
Glass fiber: not containing
Tg=121° C.
Tc=not detected Various additives for preparing the polyamide-based resin composition (a) were shown below.

(GF)
Glass fiber: glass fiber having an average fiber diameter of 10.5 μm (ECSO3T-251H manufactured by Nippon Electric Glass Co., Ltd.)

(Metal Soap/Montanic Acid Soap)
Montanic acid soap (product name: NS-8) manufactured by Nitto Chemical Industry Co., Ltd. was used.

(Metal Soap/12-Hydroxystearic Acid Soap)
12-hydroxystearic acid soap (product name: CS-6CP) manufactured by Nitto Chemical Industry Co., Ltd. was used.

Synthesis Example 1 Production of PA(S)

2800.4 g (24.1 mol) of 1,6-hexamethylenediamine, 2774.3 g (16.7 mol) of terephthalic acid, 1196.1 g (7.2 mol)

of isophthalic acid, 36.6 g (0.3 mol) of benzoic acid, 5.7 g of sodium hypophosphite monohydrate, and 545 g of distilled water were put into an autoclave having a volume of 13.6 L, and nitrogen substitution was performed. The stirring was started from 190° C. and the internal temperature was increased to 250° C. for 3 hours. At this time, the internal pressure of the autoclave was increased to 3.03 MPa. After continuing the reaction as it is for 1 hour, atmospheric emission was performed from a spray nozzle installed on the bottom of the autoclave to extract a low condensate. Then, after the cooling to room temperature, the pulverization was performed with a pulverizer to have a particle diameter equal to or smaller than 1.5 mm, and the drying was performed at 110° C. for 24 hours. The amount of moisture of the obtained low condensate was 4100 ppm and a limiting viscosity [η] thereof was 0.15 dl/g. Next, this low condensate was put into a plate type solid-phase polymerization device, nitrogen substitution was performed, and the temperature was increased to 180° C. for approximately 1 hour and 30 minutes. After that, the reaction was performed for 1 hour and 30 minutes, and the temperature was decreased to room temperature. The limiting viscosity [η] of the obtained polyamide was 0.20 dl/g. After that, melt polymerization was performed with a twin screw extruder having a screw diameter of 30 mm and L/D of 36, at a barrel set temperature of 330° C., a screw rotation rate of 200 rpm, and a resin supply speed of 6 Kg/h, and a polyamide resin was prepared. Regarding the obtained polyamide resin (PA(S)), the limiting viscosity [η] was 1.0 dl/g, the melting point (Tm) was 330° C., and the glass transition temperature (Tg) was 125° C.

Preparation Example 1 of Surface-Treated Metal Member

An aluminum plate (thickness: 2.0 mm) of alloy no. 5052 standardized based on JIS H4000 was cut to have a length of 45 mm and a width of 18 mm. This aluminum plate was dipped and swung in an acid etching agent (sulfuric acid: 8.2% by mass, ferric chloride: 7.8% by mass ($Fe^{3+}$: 2.7% by mass), cupric chloride: 0.4% by mass ($Cu^{2+}$: 0.2% by mass), ion exchange water: remainder) (30° C.) for 80 seconds for etching. Then, ultrasonic cleaning (in water, 1 minute) was performed by water flowing, drying was performed, and accordingly, a surface-treated metal member (m-1) was obtained.

The interval period of the obtained surface-treated metal member (m-1) was measured with a laser microscope (VK-X100 manufactured by KEYENCE).

In addition, the surface roughness of the obtained surface-treated metal member (m-1) was measured using a surface roughness measurement device "SURFCOM 1400D (manufactured by Tokyo Seimitsu Co., Ltd.)", and the ten point average roughness (Rz) regarding the six linear portions shown in FIG. 3 and an etching rate obtained from a mass ratio of the metal member before and after the etching treatment were calculated. The obtained results are shown below.

Interval period [μm]:95
Rz value of six linear portions [μm]:19.2, 20.8, 20.1, 23.5, 18.4, 19.6
Average value of Rz values [μm]:20.3
Etching rate [% by mass]:2.9

Preparation Example 2 of Surface-Treated Metal Member

An aluminum plate (thickness: 2.0 mm) of alloy no. 6061 standardized based on JIS H4000 was cut to have a length of 45 mm and a width of 18 mm. This aluminum plate was treated by the same method as in Preparation Example 1, except that the ultrasonic cleaning (in water) time was changed to 3 minutes, and accordingly, a surface-treated metal member (m-2) was obtained.

The results of the interval period and the surface roughness of the obtained surface-treated metal member (m-2) measured by the same method as in Preparation Example 1 are shown below.

Interval period [μm]:95
Rz value of six linear portions [μm]:45.8, 39.8, 38.0, 46.3, 47.1, 46.3
Average value of Rz values [μm]:43.9
Etching rate [% by mass]:8.5

Example 1

Figure 2:
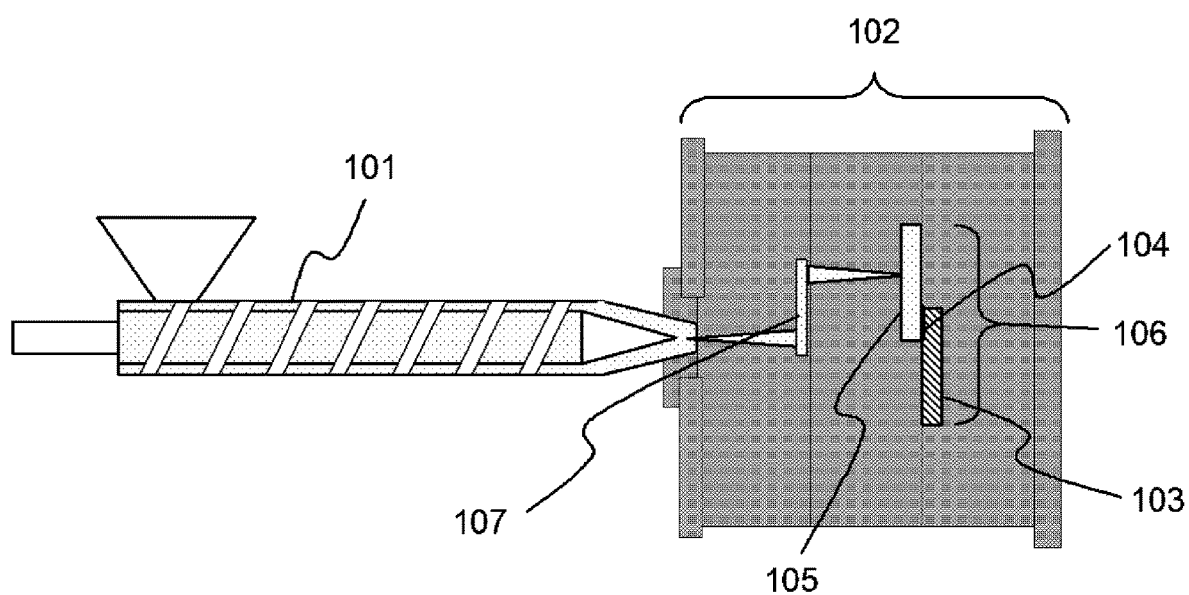
FIG. 2 is an outline view schematically showing an example of an injection molding device and a die for manufacturing the metal/resin composite structure according to the embodiment.

A small dumbbell metal insert die 102 was mounted on an injection molding device J55AD manufactured by Japan Steel Works, Ltd. Then, the die 102 was heated to 160° C. (FIG. 2), and the surface-treated metal member (m-1) was installed in the die 102.

A335 (100 parts by mass) and G16 (20 parts by mass) were weighed in a polyethylene bag, this bag was sufficiently rotated vertically and horizontally so that the raw material was evenly dry-blended. The obtained dry-blended body (DB-1) was put into a hopper of an injection unit, the injection molding was performed under the conditions of a cylinder temperature and a die temperature shown in Table 1, an injection speed of 40 mm/sec, a dwell of 90 MPa, and an injection and dwelling time of 8 seconds, and the metal/resin composite structure 106 was obtained (experiment A to experiment C). The tensile test was performed using the obtained metal/resin composite structure 106, and the measurement of the bonding strength and the observation of the fracture surface were performed. The result of the analysis of the heat properties performed regarding a test piece cut out from the polyamide-based resin member after the bonding strength measurement was also shown in Table 1.

TABLE 1

|  | Cylinder temperature ° C. | Die temperature ° C. | Bonding strength MPa | Fracture aspect | Tg ° C. | Tc ° C. | $T_{1/2}$ sec | $\chi_c$ % |
| --- | --- | --- | --- | --- | --- | --- | --- | --- |
| Experiment A | 335 | 140 | 26 | Interface breakdown | 123 | 281 | ND | ND |
| Experiment B | 335 | 160 | 45 | Base breakdown 2 | 123 | 282 | ND | ND |
| Experiment C | 335 | 180 | 57 | Base breakdown | 124 | 281 | 253 | 25 |

Note)
In the table, ND indicates no measurement.

Example 2

The injection molding was performed on the surface-treated metal member (m-1) using a dry-blended body (DB-2) prepared from C235 (100 parts by mass) and G16 (20 parts by mass), instead of the dry-blended body (DB-1) prepared from A335 (100 parts by mass) and G16 (20 parts by mass) in Example 1, and the metal/resin composite structure 106 was obtained. During the injection molding, the cylinder temperature was 335° C., the die temperature was 180° C., the injection speed was 40 mm/sec and the dwell was 90 MPa. The tensile test was performed using the obtained metal/resin composite structure 106, and as a result of the observation of the fracture surface, the base material breakdown was confirmed. The bonding strength was 56 MPa. As a result of the analysis of heat properties performed regarding a test piece cut out from the polyamide-based resin member after the bonding strength measurement, Tg was 90° C., Tc was 265° C., $T_{1/2}$ was 125 seconds, and xc was 26%.

Comparative Example 1

The injection molding was performed by using A335 as it is, instead of the dry-blended body (DB-1), under the conditions of a cylinder temperature and a die temperature shown in Table 2, an injection speed of 40 mm/sec, a dwell of 90 MPa, and an injection and dwelling time of 8 seconds, and the metal/resin composite structure 106 was obtained (experiment a to experiment c). The tensile test was performed using the obtained metal/resin composite structure 106, and the measurement of the bonding strength and the observation of the fracture surface were performed. The result of the analysis of the heat properties performed regarding a test piece cut out from the polyamide-based resin member after the bonding strength measurement was also shown in Table 2.

TABLE 2

| | Cylinder temperature ° C. | Die temperature ° C. | Bonding strength MPa | Fracture aspect | Tg ° C. | Tc ° C. | $T_{1/2}$ sec | $\chi_c$ % |
|---|---|---|---|---|---|---|---|---|
| Experiment a | 335 | 140 | 15 | Interface breakdown | 123 | 294 | ND | ND |
| Experiment b | 335 | 160 | 38 | Interface breakdown | 124 | 295 | ND | ND |
| Experiment c | 335 | 180 | 38 | Base breakdown 2 | 123 | 295 | 147 | 27 |

Note)
In the table, ND indicates no measurement.

Comparative Example 2

The injection molding was performed in the same manner as in Example 2, except that C235 is used as it is, instead of the dry-blended body (DB-2) in Example 2. As a result, it is confirmed that the resin is not bonded to the metal surface at all. As a result of the analysis of heat properties performed regarding a polyamide-based resin member peeled off from the metal surface, Tg was 78° C., Tc was 277° C., $T_{1/2}$ was 56 seconds, and xc was 29%.

Examples 3 to 8 and Comparative Examples 3 to 4

A polyamide resin, a glass fiber, and an additive shown in Table 2 were kneaded in a twin screw extruder attached with a vent of 44 mmϕ having a barrel temperature set as 335° C. at a ratio shown in Table 2, and pelletize with a pelletizer, and a pellet of the composition was obtained.

Then, the obtained pellet of the polyamide-based resin composition (a) was dried under the condition of 110° C. and 10 Torr (1330 Pa) for 24 hours, the injection molding was performed at a cylinder temperature of 335° C., a die temperature of 140° C. and 170° C., and accordingly, various test pieces was obtained. The evaluation regarding the obtained test pieces was performed by the evaluation method described above. The results thereof are shown in Table 3.

TABLE 3

| | | Example 3 | Example 4 | Example 5 | Example 6 | Example 7 | Example 8 | Comparative Example 3 | Comparative Example 4 |
|---|---|---|---|---|---|---|---|---|---|
| Metal member (M) | | m-1 | m-2 | m-1 | m-2 | m-1 | m-2 | m-1 | m-2 |
| Poly- | PA (%) | 40 | 40 | 39 | 39 | 39 | 39 | 49 | 49 |
| amide- | G16 | 10 | 10 | 10 | 10 | 10 | 10 | | |

TABLE 3-continued

| | | Example 3 | | Example 4 | | Example 5 | | Example 6 | | Example 7 | | Example 8 | | Comparative Example 3 | | Comparative Example 4 | |
|---|---|---|---|---|---|---|---|---|---|---|---|---|---|---|---|---|---|
| based resin composition (a) (wt %) | NS-8 | | | | | 0.3 | | 0.3 | | 0.3 | | 0.3 | | 0.3 | | 0.3 | |
| | CS-6CP | | | | | | | | | 0.2 | | 0.2 | | | | | |
| | GF | 50 | | 50 | | 50.7 | | 50.7 | | 50.5 | | 50.5 | | 50.7 | | 50.7 | |
| position (total) | | 100 | | 100 | | 100 | | 100 | | 100 | | 100 | | 100 | | 100 | |
| Die temperature (° C.) | | 140 | 170 | 140 | 170 | 140 | 170 | 140 | 170 | 140 | 170 | 140 | 170 | 140 | 170 | 140 | 170 |
| Heat properties | Tg (° C.) | ND | 123 | ND | 123 | ND | 122 | ND | 123 | ND | 123 | ND | 123 | ND | 123 | ND | 123 |
| | Tc (° C.) | ND | 281 | ND | 281 | ND | 280 | ND | 283 | ND | 281 | ND | 280 | ND | 296 | ND | 296 |
| | Tm (° C.) | ND | 310 | ND | 311 | ND | 309 | ND | 311 | ND | 310 | ND | 310 | ND | 327 | ND | 325 |
| | $\chi_c$ (%) | ND | ND | ND | ND | ND | 23 | ND | 21 | ND | 25 | ND | 26 | ND | 31 | ND | 31 |
| | $T_{1/2}$ (sec) | ND | ND | ND | ND | ND | 251 | ND | 248 | ND | 203 | ND | 205 | ND | 43 | ND | 46 |
| Bonding strength (MPa) | | 24 | 49 | 20 | 38 | 27 | 47 | 22 | 45 | 27 | 51 | 25 | 51 | 10 | 37 | 12 | 33 |
| Fracture aspect | | Interface breakdown | Base breakdown 2 | Interface breakdown | Base breakdown 2 | Interface breakdown | Base breakdown 2 | Interface breakdown | Base breakdown 2 | Interface breakdown | Base breakdown 1 | Interface breakdown | Base breakdown 2 | Interface breakdown | Interface breakdown | Interface breakdown | Interface breakdown |

As clearly shown from the results shown in the examples and the comparative examples, in the comparison performed with the same die temperature during the injection molding, the metal/resin composite structure configured with the polyamide-based resin member (A) satisfying both condition [A1] and condition [A2] described above, and the metal member (M) having the fine uneven surface showed a tensile shear strength higher than that of the metal/resin composite structure of the comparative examples. It is confirmed that the bonding strength tends to be improved, in accordance with an increase in die temperature or by including the metal soap in the resin member (A).

The invention claimed is:

1. A metal/resin composite structure comprising:
   a metal member (M) having a fine uneven surface comprising a plurality of protrusions; and
   a polyamide-based resin member (A) bonded to the fine uneven surface of the metal member (M), wherein the polyamide-based resin member (A) is formed from a polyamide resin which comprises
   at least one semi-aromatic polyamide selected from the group consisting of polyhexamethylene isophthalamide (polyamide 6I), polyhexamethylene adipamide/polyhexamethylene isophthalamide copolymer (polyamide 66/6I), polyhexamethylene isophthalamide/polycaproamide copolymer (polyamide 6I/6), polyhexamethylene adipamide/polyhexamethylene terephthalamide/polyhexamethylene isophthalamide copolymer (polyamide 66/6T/6I), polyhexamethylene adipamide/polycaproamide/-polyhexamethylene isophthalamide copolymer (polyamide 66/6/6I), polyhexamethylene isophthalamide/polyhexamethylene terephthalamide copolymer (polyamide 6I16T), and poly(2-methylpentamethylene terephthalamide)/poly(2-methylpentamethylene isophthalamide) copolymer (polyamide M5T/M5I); and
   at least one polyamide selected from the group consisting of polyhexamethylene terephthalamide (polyamide 6T), polyhexamethylene adipamide/polyhexamethylene terephthalamide copolymer (polyamide 66/6T), and polyhexamethylene terephthalamide/polyhexamethylene isophthalamide copolymer (polyamide 6T/6I),
   wherein the polyamide-based resin member (A) satisfies the following condition [A1] and condition [A2]:
   [A1] a glass transition temperature (Tg) observed by a differential scanning calorimeter (DSC) equal to or higher than 85° C. and equal to or lower than 140° C.; and
   [A2] a crystallization temperature (Tc) observed by a DSC is equal to or higher than 250° C. and equal to or lower than 292° C., and
   wherein the polyamide-based resin member (A) includes a metal soap, wherein the metal soap includes montanic acid soap and 12-hydroxystearic acid soap, and the content of the montanic acid soap relative to 100% by mass of the metal soap is more than 20% by mass and less than 100% by mass.

2. The metal/resin composite structure according to claim 1, wherein the polyamide-based resin member (A) further satisfies at least one of the following condition [A3] and condition [A4]:
   [A3] a semi-crystallization time $T_{1/2}$ is 70 seconds or longer, wherein the semi-crystallization time $T_{1/2}$ is measured by increasing the temperature from 30° C. to 350° C. at a set rate of 500° C./min, and holding the temperature for 5 minutes, and instantly decreasing the temperature to 297° C. at a set rate of a rate of temperature fall of 500° C./min, and measuring the crystallization peak under the isothermal condition, then calculating the time from the point when the crystallization has started to the point when the crystallization has been accelerated half way (point when the area becomes 1/2 with respect to the entire crystallization peak area) by using the measured crystallization peak; and
   [A4] a crystallization degree (xc) obtained from an enthalpy of fusion at the measurement of a differential scanning calorimeter (DSC) is equal to or less than 27%.

3. The metal/resin composite structure according to claim 1, wherein the polyamide-based resin member (A) further satisfies the following condition [A1']:
   [A1] the glass transition temperature (Tg) measured by a differential scanning calorimeter (DSC) is equal to or higher than 115° C. and equal to or lower than 140° C.

4. The metal/resin composite structure according to claim 1, wherein the polyamide-based resin member (A) includes an inorganic filler.

5. The metal/resin composite structure according to claim 4,
wherein a content of the inorganic filler in the polyamide-based resin member (A) is greater than 0% by mass and equal to or less than 80% by mass, where the entire content of the polyamide-based resin member (A) is 100% by mass.

6. The metal/resin composite structure according to claim 1, wherein a content of the metal soap in the polyamide-based resin member (A) is greater than 0.0% by mass and equal to or less than 10% by mass, where the entire content of the polyamide-based resin member (A) is 100% by mass.

7. The metal/resin composite structure according to claim 1,
wherein a tensile shear strength of the bonded surface between the metal member (M) and the polyamide-based resin member (A), which is measured under the conditions of 23° C., a distance between chucks of 60 mm, and a tensile rate of 10 mm/min by using a tensile tester, is equal to or greater than 40 MPa and equal to or smaller than 70 MPa.

8. The metal/resin composite structure according to claim 7, wherein a fracture surface after the test of the tensile shear strength has a base material breakdown.

9. The metal/resin composite structure according to claim 1,
wherein the metal member (M) includes one kind or two or more kinds selected from iron, high tensile steel, stainless steel, aluminum, aluminum alloy, magnesium, magnesium alloy, copper, copper alloy, titanium, and a titanium alloy.

10. The metal/resin composite structure according to claim 1,
wherein the protrusions have an interval period of equal to or greater than 5 nm and equal to or smaller than 500 μm.

11. An engine mount member comprising the metal/resin composite structure according to claim 1.

12. A manufacturing method of the metal/resin composite structure according to claim 1, the method comprising:
a step (i) of inserting the metal member (M) having a fine uneven surface to an injection molding die; and
a step (ii) of injecting a polyamide-based resin composition (a) including the polyamide resin and the metal soap to a surface of the inserted metal member (M), and bonding the polyamide-based resin member (A) which is a molded body of the polyamide-based resin composition (a) to the surface of the metal member (M), by causing the injected polyamide-based resin composition (a) to permeate fine recesses and protrusions of the fine uneven surface and solidifying the polyamide-based resin composition.

13. The manufacturing method of the metal/resin composite structure according to claim 12,
wherein a temperature of the injection molding die in the step (ii) is 100° C. to 250° C.

* * * * *